United States Patent [19]

Inujima et al.

[11] 3,968,039

[45] July 6, 1976

[54] FILTER PRESS

[75] Inventors: Kazuo Inujima, Sakai; Kiyohiko Tokunaga, Kishiwada; Yoshiyuki Sotobayashi, Amagasaki, all of Japan

[73] Assignee: Kubota Tekko Kabushiki Kaisha (Kubota, Ltd.), Osaka, Japan

[22] Filed: Jan. 23, 1975

[21] Appl. No.: 543,234

[30] Foreign Application Priority Data

Nov. 26, 1974  Japan............................ 49-137336

[52] U.S. Cl. ............................................... 210/225
[51] Int. Cl.² ........................................ B01D 25/32
[58] Field of Search ........... 210/224, 225, 226, 227, 210/228, 229, 230; 100/112

[56] References Cited
UNITED STATES PATENTS

| | | | |
|---|---|---|---|
| 3,647,082 | 3/1972 | Ishigaki | 210/225 |
| 3,690,462 | 9/1972 | Kurita | 210/225 |
| 3,696,930 | 10/1972 | Tokura | 210/225 |
| 3,698,557 | 10/1972 | Ishigaki | 210/225 |
| 3,767,052 | 10/1973 | Shibasaki | 210/225 |
| 3,807,567 | 4/1974 | Iwatani | 210/225 |

*Primary Examiner*—Theodore A. Granger
*Attorney, Agent, or Firm*—George B. Oujevolk

[57] ABSTRACT

A filter press adapted to travel a filter cloth. Sludge is fed under pressure from mouthpieces into between double filter cloths put between a set of filter plates arranged side by side. The sludge is separated into filter cake and filtrate. The former remains between the double filter cloths and the latter passes through the filter cloth and is discharged from the side of the filter plates. The filter cake falls off the filter cloth when the filter plates are spread out to strain it.

3 Claims, 8 Drawing Figures

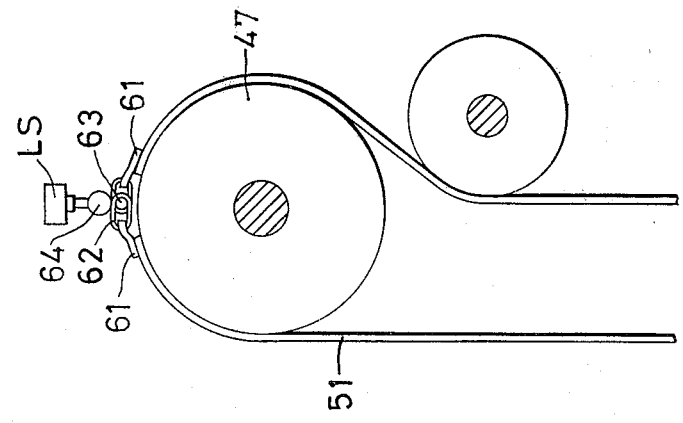
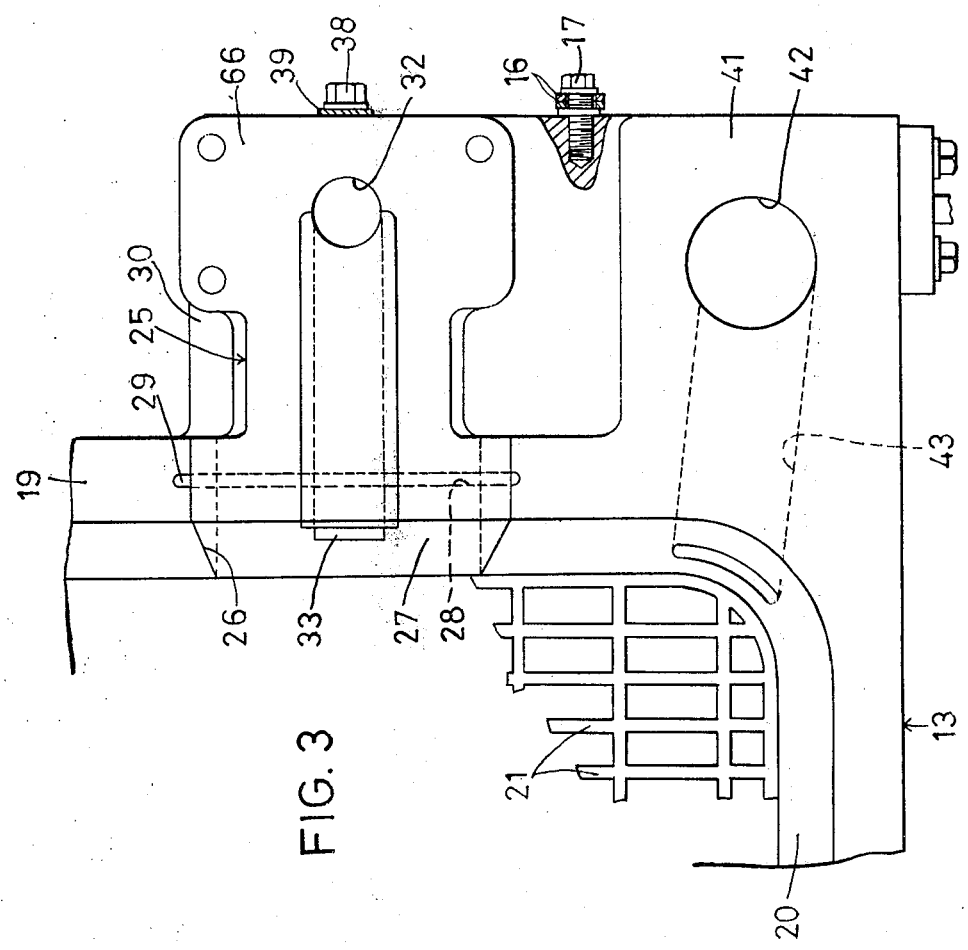

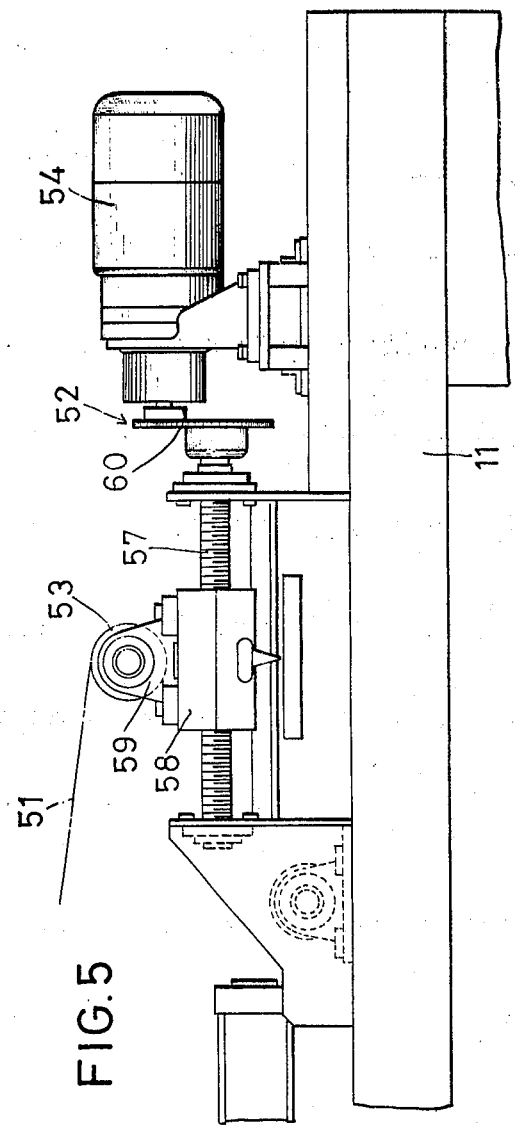
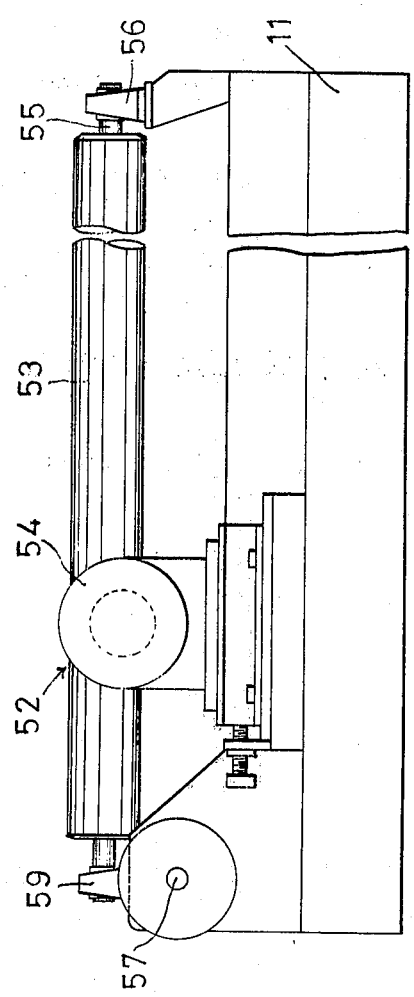

FILTER PRESS

The present invention relates to a single type filter press which separates sludge suspension into solid and liquid by use of a travelling filter cloth.

A conventional filter press with a travelling filter cloth, called a double type, included filter frames and filter plates arranged alternately with a filter cloth put between each pair of the filter plate and the filter frame, the space within the filter frames being covered from both sides by filter cloth. A sludge to be filtered was fed under pressure into the space for separation into solid and liquid.

On such a conventional filter press, filter cake formed within the filter frames was very difficult to discharge. After the filter frames have been separated from the filter plates, the filter frames had to be tilted to let cake fall or only the filter plates had to be lowered and filter cake be pushed with a pusher or the like out of the corners of the filter frames. Such an extremely complicated process was required for removal of filter cake, and even this was not enough to remove it completely.

An object of the present invention is to provide a filter press which employs no filter frames and includes a filter cloth doubly and runnably put between each pair of filter plates, and mouthpieces inserted between the double filter cloths to force sludge or suspension under pressure into between the double filter cloths for separation into solid and liquid, and is simple in construction and has extremely high filtering efficiency, compared with conventional filter presses.

Another object of the present invention is to provide a filter press which permits complete removal of filter cake by means of a simple mechanism which lets filter cake fall off the filter cloth under its own weight by straining the cloth when the filter plates are opened.

A further object of the present invention is to provide a filter press adapted to run or circulate an endless filter cloth for efficient cleaning of the filter cloth and effective filtration.

A still further object of the present invention is to provide a filter press on which a filter cloth can be easily guided doubly between filter plates.

Another object of the present invention is to provide a filter press adapted to always stop the endless filter cloth with its joint away from any filtering zones to prevent the joint from interfering with filtration.

Still another object of the present invention is to provide a filter press which includes packings and the like at the connections between the mouthpieces and the filter plates for complete sealing, thereby eliminating troublesome machining for sealing.

These objects are accomplished by the improvements, combinations and arrangements of parts comprising the invention, a preferred embodiment of which is shown by way of example in the accompanying drawings, and herein described in detail.

The present invention consists in a filter press which comprises a filter cloth runnably intervened doubled between the filter plates, and mouthpieces for forcing a sludge suspension under pressure into between the double filter cloths for separation into solid and liquid, and on which filter cake remaining between the filter cloths easily falls under its own weight when the filter plates are spread to strain the filter cloth.

FIG. 3 is an enlarged front view of the principal portion;

FIG. 5 is an enlarged side view of a deflection corrector on the filter press;

FIG. 6 is an enlarged front view of the deflection corrector shown in FIG. 5;

FIG. 8 is an enlarged vertical sectional side view of a limit switch used to detect the joint of the filter cloth.

Figure 1:
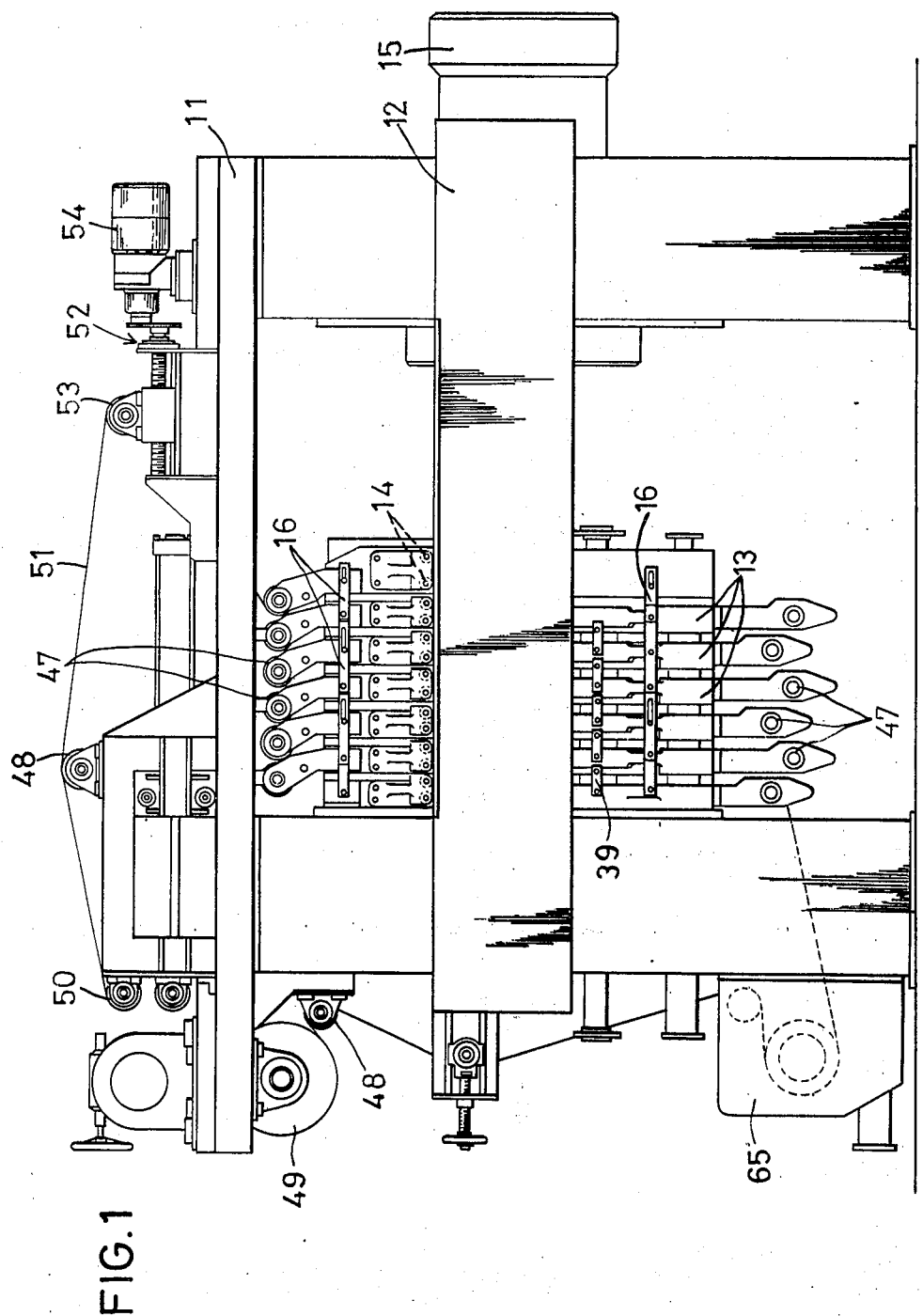
FIG. 1 is a side view of a filter press in accordance with the present invention.

Referring to FIG. 1, the numeral 11 designates a frame, to each side of which is fixed a body supporting frame 12 parallel to each other.

A plurality of filter plates 13 are mounted vertically between the body supporting frames 12, with wheels 14 on each side thereof resting on said frames 12 for free movement thereon.

A hydraulic cylinder 15 is mounted on one end of the frame 11. A piston rod extending from the cylinder 15 is coupled to a filter plate 13 at extreme right-hand end in FIG. 1 to move it on the frames 12 by means of the hydraulic cylinder 15.

Any pairs of adjacent filter plates 13 are coupled to each other by links 16 at the side top and bottom thereof to keep them spaced from each other for a fixed distance when they are pulled open.

Figure 2:
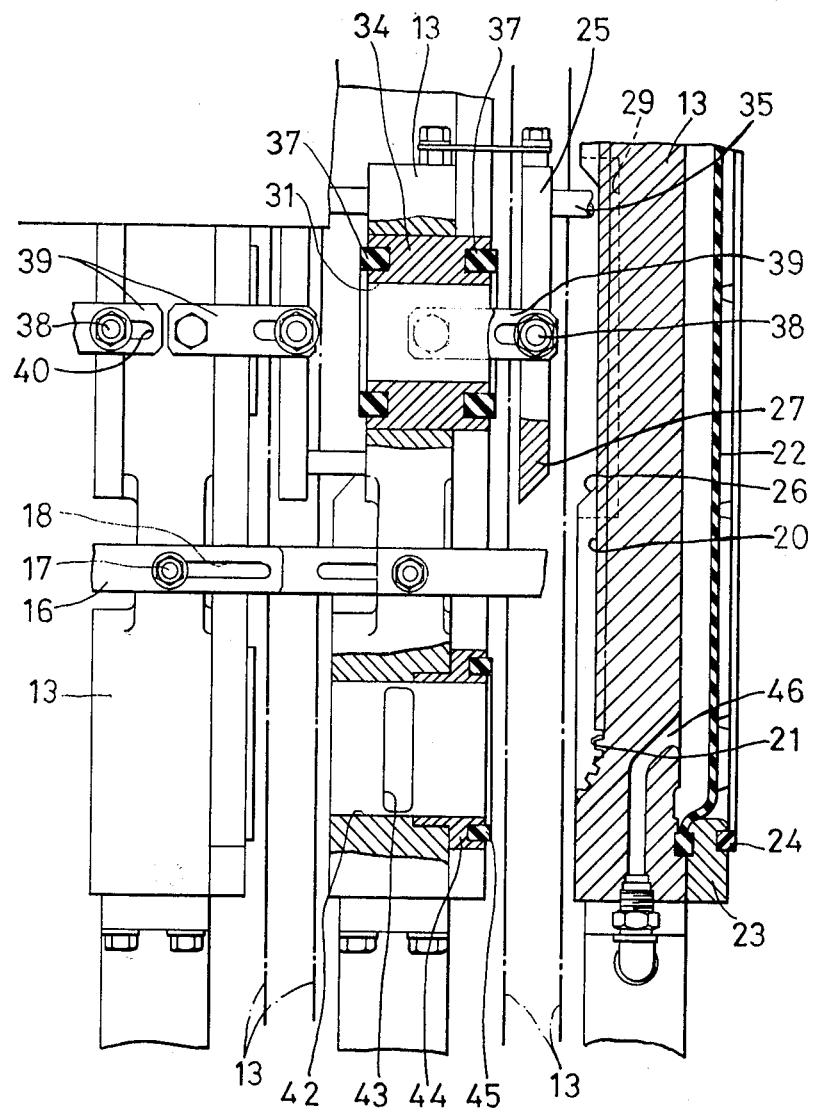
FIG. 2 is an enlarged vertical sectional side view of a principal portion of the filter press.

As more detailedly shown in FIG. 2, one end of a link 16 is fixed by a link fixing pin 17 to the side of said filter plate 13 with said pin 17 on the adjacent filter plate loosely fitted in an elongated hole 18 in the other end of the link 16. When the hydraulic cylinder 15 operates to pull the filter plate 13 at end, the other filter plates also are pulled through the links 16 successively so that the filter plates 13 are spread out at a fixed distance therebetween to their open position.

Also, when the cylinder 15 operates to push the filter plate 13 at end, the other filter plates also are pushed one after another into such a closed position as shown in FIG. 1. Said elongated holes 18 accommodate such a movement of the filter plates 13 between their open and closed positions.

As shown in FIGS. 2 and 3, the filter plates 13 are formed with a recess 20 at one surface thereof, leaving only the peripheral portion 19 as it is. In the bottom of the recess 20 are formed a lot of narrow channels 21 connecting with one another.

To the other surface of the filter plates 13, a diaphragm 22 having a rugged surface is mounted with its periphery sealingly clamped thereto by a clamping frame 23.

A frame-like packing 24 is projectingly mounted in a groove formed in the outer edge of each clamping frame 23 facing the adjacent filter plate over the whole periphery thereof.

In a portion of the periphery 19 of the recessed surface of each filter plate 13 is formed a hollow 26 to receive a mouthpiece 25. The hollow 26 is of a trapezoidal or arcuate cross-section so as to receive a fitting portion 27 of the mouthpiece 25.

Figure 4:
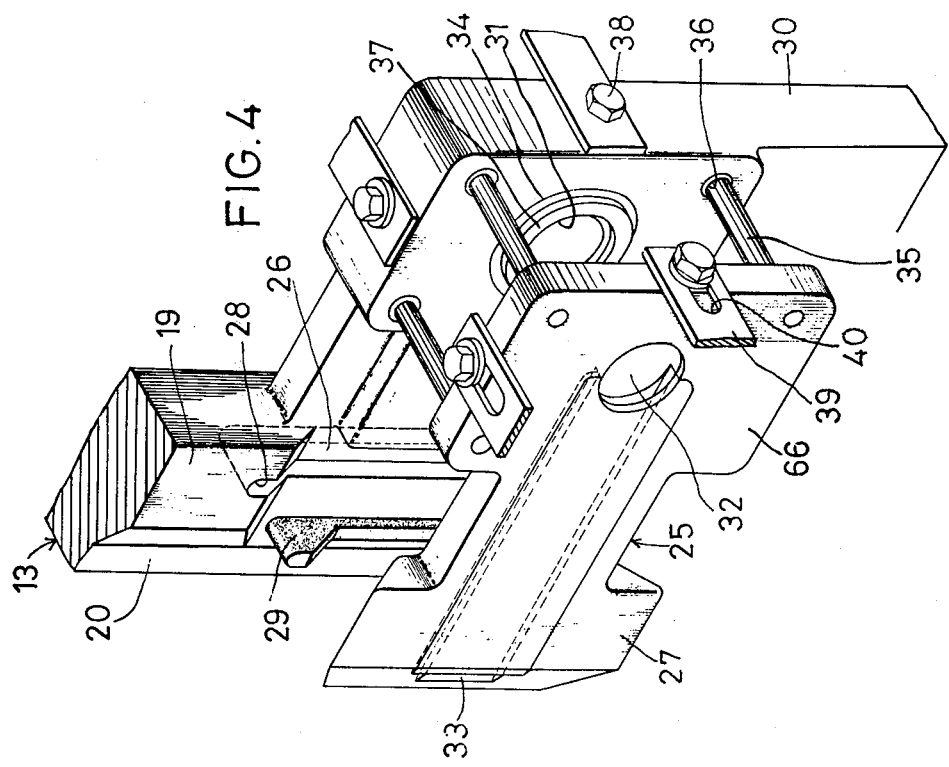
FIG. 4 is an enlarged perspective view of the principal portion.

As shown in FIGS. 3 and 4, a groove 28 is formed in the hollow 26 along the periphery 19 of the filter plate and slightly beyond the whole length of the hollow 26. The groove 28 has a flat bottom as shown by chain line in FIGS. 2 and 4.

A seal packing 29 is removably mounted in the groove 28, said seal packing 29 having an outer end shaped to have a tight fit with the mouthpiece 25 that fits in the hollow 26.

As shown in FIGS. 3 and 4, each mouthpiece 25 consists of a flat fitting portion 27 that fits in the hollow 26 and a pipeline forming portion 66 opposite to a projecting portion 30 of the respective filter plate 13 which projects outward from the hollowed portion of the periphery thereof.

The pipeline forming portion 66 has a through opening 32 therein coaxial with a through opening 31 formed in the projecting portion 30 of the respective filter plate. Each mouthpiece 25 has a suspension feed port 33 which communicates with the opening 32 and is open to the recess 20 at the inner end of the fitting portion 27.

In a hole in the projecting portion 30 provided at one or both sides of each filter plate 13 is fitted a cylindrical seal boss 34 whose inner periphery defines the opening 31 coaxial with the opening 32 in the mouthpiece 25.

A plurality of guide bars 35 are fixed to one surface of the pipeline forming portion 66 of each mouthpiece 25 opposite to the projecting portion 30 of the filter plate. The guide bars 35 are slidably fitted in guide holes 36 in the projecting portion 30 of each filter plate.

This arrangement keeps the mouthpieces 25 in correct position with respect to the filter plates 13 and keeps the openings 32 concentric with the openings 31 as the mouthpieces 25 move into and out of contact with the filter plates 13.

An annular packing 37 is mounted in an annular groove formed in each end of the seal boss 34. When the filter plates 13 are pressed together to their closed position, the openings 32 in the mouthpieces 25 communicate with the openings 31 in the filter plates 13 to define a suspension feed line with the connections therebetween sealed by the packings 37.

One end of the suspension feed line, that is, the outer end of the opening 31 in the filter plate at one end is closed. Accordingly, sludge supplied from the opening 31 in the filter plate at the other end will be fed to the feed port 33 of each mouthpiece 25.

As shown in FIGS. 2 and 4, to the outer side and top of each mouthpiece 25 are fixed pins 38, which are loosely fitted in an elongated hole 40 in one end of links 39 whose other end is secured to the respective filter plate 13 at the outer side and top thereof.

Since the mouthpieces 25 are so coupled to the filter plates 13 by the links 39, they also detach from the respective filter plates 13 at a fixed distance when the filter plates 13 are spread out.

In a lower projecting portion 41 under the projecting portion 30, each filter plate 13 also includes a through opening 42 and a filtrate passage 43 which connects the opening 42 to the recess 20 therein.

A seal boss 44 as shown in FIG. 2 is fitted in one end of each said opening 42. In an annular groove formed in the outer end of the seal boss 44 is mounted an annular packing 45.

When the filter plates 13 are pressed together into close contact with one another, the openings 42 therein will connect with one another to define a filtrate discharge line with the connections therebetween sealed by the packings 45. The filtrate can be discharged from one end of the discharge line thus defined.

As shown in FIG. 2, each filter plate 13 is provided with a pressure water feed port 46 that communicates with the inside of the diaphragm 22. To the water feed port 46 is connected a hose from a source of water under pressure. By switching action of valves, water under pressure is supplied into, and drained out of, between the diaphragms 22 and the filter plates 13 to inflate and deflate the diaphragms 22, respectively.

As shown in FIG. 1, an endless filter cloth 51 is stretched around guide rolls 47 provided over and under the filter plates 13, and another guide roll 48, a driving roll 49 and strainer rolls 50 provided at suitable positions on the frame 11.

The filter cloth 51 is passed doubly between each pair of the filter plates 13 by bringing it alternately to the upper and lower guide rolls 47 in zigzag.

A deflection corrector 52 for the filter cloth 51 is provided on top of the frame 11. It consists essentially of a correction roll 53 around which the filter cloth 51 travels, and a driving motor 54 for it, as shown in FIGS. 5 and 6.

The shaft 55 of the correction roll 53 has one end journaled on a swingable bearing 56 at one side of the frame 11 and the other end journaled on a swingable bearing 59 on a slide rest 58 longitudinally moved by a driving screw 57.

As best shown in FIG. 5, the driving screw 57 is rotatably mounted with its ends on a supporting frame on the frame 11 and is driven in either direction by said motor 54 through a reduction mechanism 60.

Though not shown, a pair of detectors are provided at suitable positions on the frame 11 to detect the position of edges of the filter cloth 51. If one of them detects any abnormal position of edge of the filter cloth resulting from its running crooked, a signal is transmitted to the motor 54, which skews the roll 53 in a proper direction, thereby automatically bringing the filter cloth 51 back to its original normal position.

If the filter cloth 51 is running crooked rightward and leftward, the roll 53 is skewed in such a direction as to strain the left and right sides of the filter cloth 51, respectively. Any deflection of the filter cloth 51 is thus corrected making use of its tendency to shift toward the strained side.

Figure 7:
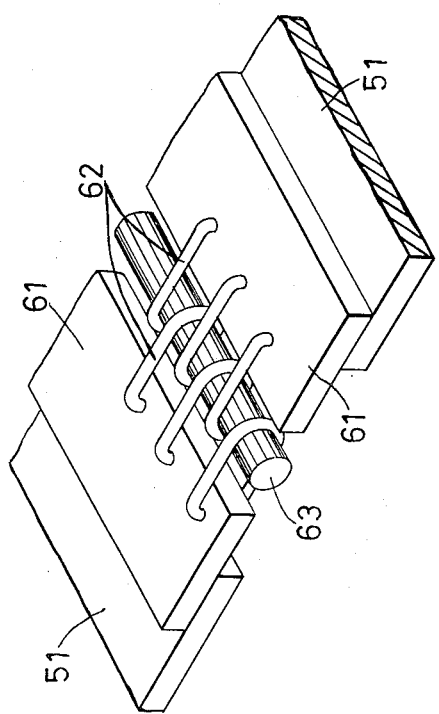
FIG. 7 is an enlarged perspective view of the joint where the ends of a filter cloth is joined together into an endless form.

The filter cloth 51 is an endless cloth into which the ends of a long strip of filter cloth are joined by use of a coupling. For easy removal and mounting of the filter cloth, the ends are joined with a metal coupling. For example, as shown in FIG. 7, the filter cloth 51 is joined with a coupling 61 attached to the ends thereof. Ring-like portions of metal pieces 62 secured to the halves of the coupling 61 are aligned with each other and a metal rod 63 is inserted therein. The filter cloth does not function as such at the joint area since it is not watertight there. In the present invention, such a device as shown in FIG. 8 for detecting the coupling is provided to prevent filtration from taking place with the coupling located between the filter plates, thus causing damage to the coupling and the metal pieces thereof.

More detailedly, a limit switch LS is mounted, adjacent to each of the guide rolls 47, on a supporting frame for the bearings on which the guide roll 47 is journaled, with its actuator 64 facing the outside of the filter cloth 51 around the guide roll 47. The actuator 64 is so positioned as to be kept apart from the filter cloth but to be pushed in by the coupling 61 or the metal piece 62 thereof. Each of the limit switches LS is connected to a filter cloth drive so that when the actuator 64 thereof is pushed in, the filter cloth will be stopped.

A device 65 for cleaning the filter cloth 51 is provided at a suitable position on the frame 11. The projecting portions 30 and 41 of each filter plate 13 project outward beyond the outer edge of the filter cloth 51.

A filter press in accordance with the present invention is of such a construction as described above. Operation of the filter press will be explained below.

When the hydraulic cylinder 15 is actuated with the driving roll 49 for the filter cloth 51 stopped, the filter plates 13 are pressed together into close contact with one another and with the mouthpieces 25 as shown in FIG. 1.

The mouthpieces 25 will be sandwiched between the double filter cloths 51 between the filter plates 13. A sludge or suspension to be filtered is then fed from one end of the suspension feed line defined by the openings 31 and 32 that have communicated with one another.

The sludge or suspension is poured from the ports 33 in the mouthpieces 25 into between the double filter cloths 51. Water under pressure is then forced from the water feed ports 46 of the filter plates 13 into between the diaphragms 22 and the filter plates 13.

The diaphragms 22 will be inflated as shown in FIG. 2, thus applying pressure to the suspension between the filter cloths 51 and pressing them into the recesses 20 so that water will be squeezed out from the suspension into the recesses 20.

The filtrate passes through a plurality of the filtrate channels 21 in the recesses 20 and then the filtrate passages 43 and is drained from one end of the filtrate discharge line defined by the openings 42 in the filter plates 13.

Filter cake will remain between the double filter cloths 51.

The hydraulic cylinder 15 operates again to open or spread out the filter plates 13 and the mouthpieces 25. Simultaneously, thanks to the filter cloth strainer roll 50, the filter cloth 51 will be strained so that filter cake falls off the filter cloth.

Then the driving roll 49 for the filter cloth 51 starts. After the filter cloth 51 has run for a predetermined length, the cylinder 15 operates to press the filter plates 13 and the mouthpieces 25 together to repeat such filtering process as described above. Cleaning of the filter cloth is accomplished by means of a cleaner 65 which consists of a cleaning brush, a cleaning spray, etc.

Although the preferred embodiment includes diaphragms, the present invention may be embodied without use of any diaphragms. The filter plates 13 shown in FIG. 2 may be shaped to have a recess at both surfaces thereof to be symmetrical, with a filter cloth doubled between the filter plates and mouthpieces inserted between the filter cloths to pour suspension into therebetween.

It will thus be seen that the present invention provides a filter press which permits extremely easy removal of filter cake and provides high filtering efficiency, compared with the prior art construction including a single filter cloth between each pair of filter plate and filter frame. A hollow is formed in only one surface of each filter plate so that when the mouthpiece is fitted in this hollow, the fitting portion thereof will be flush with the surface of the filter plate. Also, in the groove formed in each hollow is mounted a packing so shaped as to have a sealing fit with the fitting portion of the mouthpiece. These assure watertightness at the areas where the mouthpieces are fitted. In each of the openings defining the suspension feed line is mounted a seal boss having an annular groove formed to mount a seal packing therein. This eliminates the necessity of machining an annular groove for packing in each filter plate itself. If a seal boss gets damaged near the annular groove thereof for packing, it has only to be replaced. The use of an endless filter cloth permits efficient cleaning of the filter cloth. Also, the deflection corrector for the filter cloth keeps it running straight.

What is claimed is:

1. A filter press comprising:
   a. a longitudinal rectangular frame (11) to each side of which are supports (12) for holding filter plates (13);
   b. a plurality of vertically disposed filter plates (13) having a projecting portion (30) with sliding means (14) for free movement along said supports (12);
   c. sliding link means (16) at the sides of said filter plates (13) coupling said filter plates for movement towards or away from each other;
   d. hydraulic cylinder means horizontally disposed, coupled to said filter plates to push them together or pull them apart;
   e. a filtrate recess portion (20) in said filter plates at one surface, with filtrate passages (21) at the bottom, a sealing diaphragm (22) at the other surface, and a hollow (26) in said recess portion (20);
   f. a mouthpiece (25) for each of said filter plates for entering said hollow, said mouth piece having a flat fitting portion (27) that fits in said hollow (20), a pipeline portion (66) opposite said projecting portion (30) of the respective filter plate with a corresponding pipeline aperture (32) and, guide means (35, 36) to couple the pipeline portion aperture (32) and the projecting portion apertures (32) so as to form a pipeline when said filter plates are pressed together, a lower projecting portion (41) under the projecting portion (30) with an opening (42), a filtrate conduit (43) leading to said opening (42) from said filtrate passages (21) so that when said openings (42) are pressed together a discharge line is formed and the filtrate can be discharged from one end of the line;
   g. pressure water feed means (46) coupled to said filter plates (13) to feed water under pressure to said diaphragm; and,
   h. roller means for passing an endless filter cloth (51) along a travel path over and under said filter plates (13), with filter cloth cleaning means (65) along said travel path.

2. A filter press claimed in claim 1, including as said sliding link means (16), links at the side top and side bottom of each filter plate (13) with elongated apertures (18) and pins (17) holding said links (13) to adjacent filter plates.

3. A filter press as claimed in claim 1, including as said pressure water feed means (46) a port in each filter plate with a feed hose connected, said port being directed to the inside of said diaphragm to feed water under pressure to said diaphragm.

* * * * *